(12) United States Patent
Camerer

(10) Patent No.: US 6,266,925 B1
(45) Date of Patent: Jul. 31, 2001

(54) WEATHER STRIPPING SYSTEM WITH HEATING ELEMENT FOR VEHICLES

(76) Inventor: Bard E. Camerer, P.O. Box 302, Kampsville, IL (US) 62053

( * ) Notice: Subject to any disclaimer, the term of this patent is extended or adjusted under 35 U.S.C. 154(b) by 0 days.

(21) Appl. No.: 09/479,373

(22) Filed: Jan. 5, 2000

Related U.S. Application Data

(63) Continuation of application No. 09/115,999, filed on Jul. 15, 1998, now abandoned.

(51) Int. Cl.[7] .................................. E06B 7/16; E06B 7/22
(52) U.S. Cl. .......................................... 49/475.1; 49/498.1
(58) Field of Search .............................. 49/475.1, 496.1; 62/275; 219/200–213

(56) References Cited

U.S. PATENT DOCUMENTS

| | | | | |
|---|---|---|---|---|
| 3,633,374 | * | 1/1972 | Canter | 62/275 X |
| 4,080,764 | * | 3/1978 | Stowik et al. | 62/275 X |
| 5,511,344 | * | 4/1996 | Dupuy | 49/496.1 |
| 5,791,407 | * | 8/1998 | Hammons | 62/244 X |

* cited by examiner

*Primary Examiner*—Daniel P. Stodola
*Assistant Examiner*—Hugh B. Thompson
(74) *Attorney, Agent, or Firm*—Joseph N. Breaux

(57) ABSTRACT

A heated vehicle weather stripping system which comprises a power supply and a number of rubber weather stripping elements each including resilient rubber weather stripping portions and a heating element installed within the resilient weather stripping portion wherein the heating element is controlled by a control unit that prevents the heating element from being heated to a temperature above the point where the weather stripping would be damaged and further activates the heating element to keep the weather stripping above the freezing point and thus preventing the doors and hatches of the vehicle from being frozen shut from frozen weather stripping. The control unit is powered by either 115 volts AC power or 12 volts DC power and is alternatively activated by an on/off switch located within the vehicle, an on/off switch located outside the vehicle, or a remote control on/off sender attached to a key chain of the user.

2 Claims, 3 Drawing Sheets

WEATHER STRIPPING SYSTEM WITH HEATING ELEMENT FOR VEHICLES

This is a continuation of U.S. patent application Ser. No. 09/115,999, filed Jul. 15, 1998, now abandoned.

TECHNICAL FIELD

The present invention relates to devices and methods for vehicle weather stripping and more particularly to devices and methods for a heated vehicle weather stripping system that comprises a power supply, a number of weather stripping elements each including a resilient rubber weather stripping portion and a heating element installed within the resilient weather stripping portion that is controlled by a control unit that prevents the heating elements from being heated to a temperature above the point where the resilient rubber weather stripping would be damaged, the control unit further comprises a thermostat for keeping the weather stripping above the freezing point and thus preventing the doors and hatches of the vehicle from being frozen shut.

BACKGROUND ART

A problem frequently encountered in colder climates is the freezing of weather stripping around doors and hatches of vehicles which prevents a user from either entering or exiting the vehicle when the weather stripping has become frozen to body parts of the vehicle. A substantial amount of force is required to overcome the boding created by the frozen weather stripping. A typical person is usually unable to supply sufficient force to overcome the frozen bond accordingly, a need exists for a device which would alleviate the force required to overcome frozen weather stripping in doorways and hatches of vehicles.

Prior art patents which are concerned with vehicle weather stripping are as follows:

Yamashita, U.S. Pat. No. 5,639,533 which discloses a door weather strip.

Balcerski, et al, U.S. Pat. No. 5,558,741 which discloses a method for making a weather strip.

Takeuchi, U.S. Pat. No. 5,369,914 which discloses a weather strip.

Omura, et al, U.S. Pat. No. 5,367,830 which discloses a roof side weather strip for a motor vehicle.

Miyakawa, et al, U.S. Pat. No. 5,343,655 which discloses a weather strip for the window glass of an automobile.

Moore, U.S. Pat. No. 5,311,702 which discloses a door seal.

As can be seen from the prior art patents there has never been a device as the present which overcomes the problem associated with frozen weather stripping on vehicle doors and hatches. Additionally, there has never been a weather strip system as the present which includes a power supply, a number of weather stripping elements each including resilient rubber weather stripping portions and a heating element installed within the resilient rubber weather stripping portion that is controlled by a control unit wherein the control unit prevents the heating element from being heated to a temperature above the point where the weather stripping would be damaged and further the control unit includes a thermostat for keeping the weather stripping above the freezing point and preventing the doors and hatches from being frozen shut from frozen weather stripping, further wherein the power supply is either 115 volt conventional AC power or 12 volt VC power from the vehicle's battery and further wherein the system is either activated remotely by a small key ring remote control, an external on/off switch or an on/off switch mounted within the interior of the vehicle.

GENERAL SUMMARY DISCUSSION OF INVENTION

It is thus an object of the invention to provide a Heated vehicle weather stripping system that prevents the doors and hatches of a vehicle from freezing shut by providing a system that heats the doors and hatches weather stripping.

It is a further object of the invention to provide a Heated vehicle weather stripping system that includes a power supply which may be either 115 volt AC or 12 volts DC supplied from the vehicle's battery.

It is a still further object of the invention to provide a Heated vehicle weather stripping system that comprises a power supply, a number of rubber weather stripping elements each including a resilient rubber weather stripping portion and a heating element installed within the resilient rubber weather stripping portion that is controlled by a control unit that prevents the heating element from being heated to a temperature above the point where the weather stripping would be damaged and further includes a thermostat for keeping the weather stripping above the freezing point and preventing the doors and hatched of a vehicle from being frozen shut from frozen weather stripping.

Accordingly, a Heated vehicle weather stripping system is provided that comprises a power supply that is either 12 volt VC or 115 volts AC and includes a number of rubber weather stripping elements each including resilient rubber weather stripping portions and a heating element installed within the resilient rubber weather stripping portion that is controlled by a thermostatic control unit that prevents the heating element from being heated to a temperature above the point where the weather stripping would be damaged and further activates the heating strip to prevent the weather stripping on the vehicle's doors and hatches from being frozen, further wherein the device is activated either by a remote control actuating device which may carried by a user on his/her key chain, and alternatively may be activated by a on/off switch located outside the vehicle and alternatively may be activated by an on/off switch located within the interior of the vehicle.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

In use, one who desires to keep their vehicle doors from sticking shut during cold weather would simply install the heated vehicle weather stripping system including the heating elements within the rubber weather stripping around the doors and hatches of a vehicle, install the control box, connect the external plug of the control box to any handy AC power source. The user would then energize the heating unit via the on/off switch or remote control. The heating elements which are located inside the rubber weather stripping would then warm the rubber and prevent the door from sticking shut, use of the heated vehicle weather stripping system would provide a very practical and convenient method of enhancing the safety for one who experiences freezing weather conditions by ensuring that he/she would always be able to get his/her car doors and/or hatch or trunk lids open thereby preventing the vehicle operator from being stranded in the cold or possibly requiring assistance.

Figure 1:
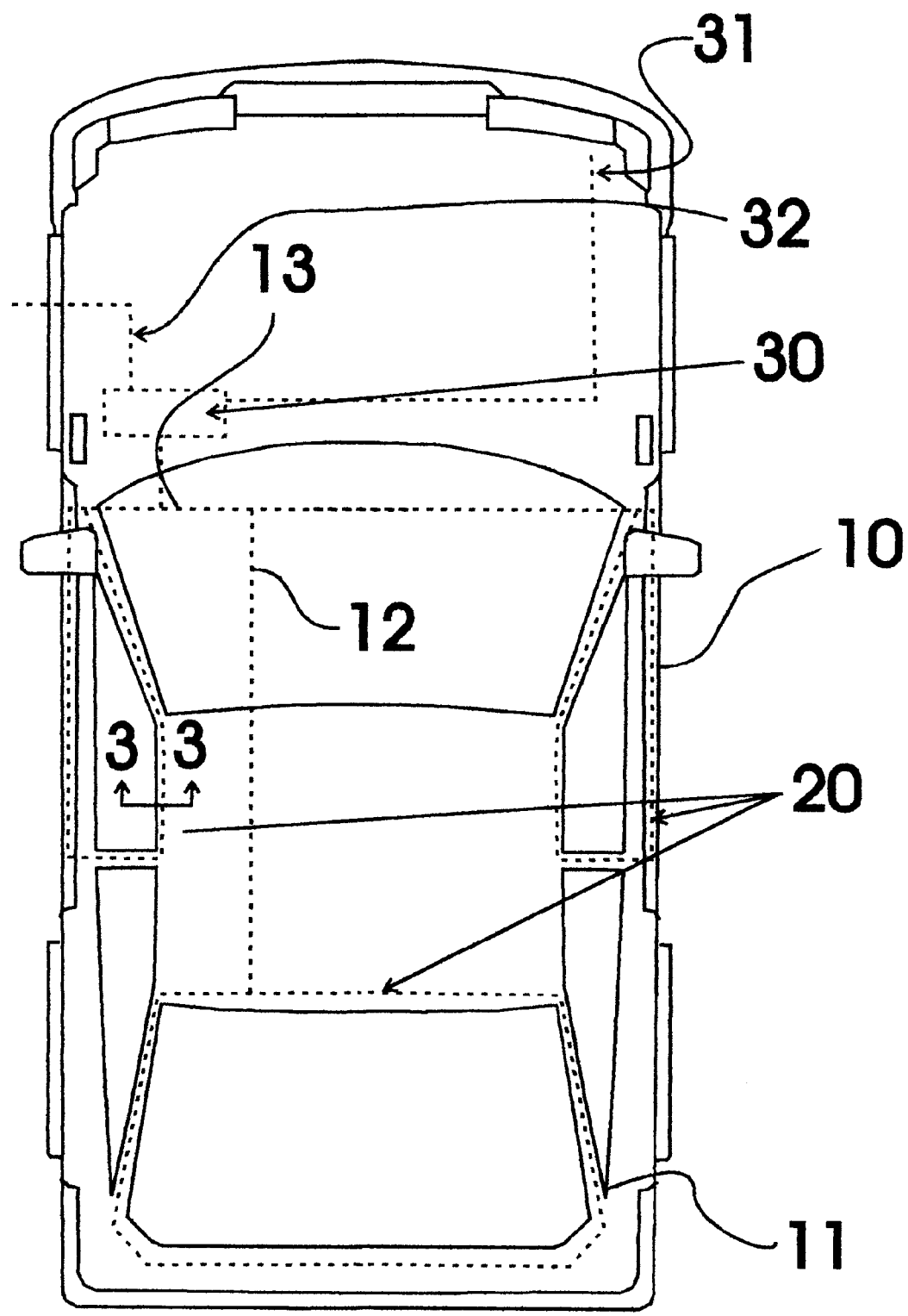
FIG. 1 is a top view of a vehicle illustrating the location of numerous heated vehicle weather stripping and the heated vehicle weather stripping systems component parts.
Figure 2:
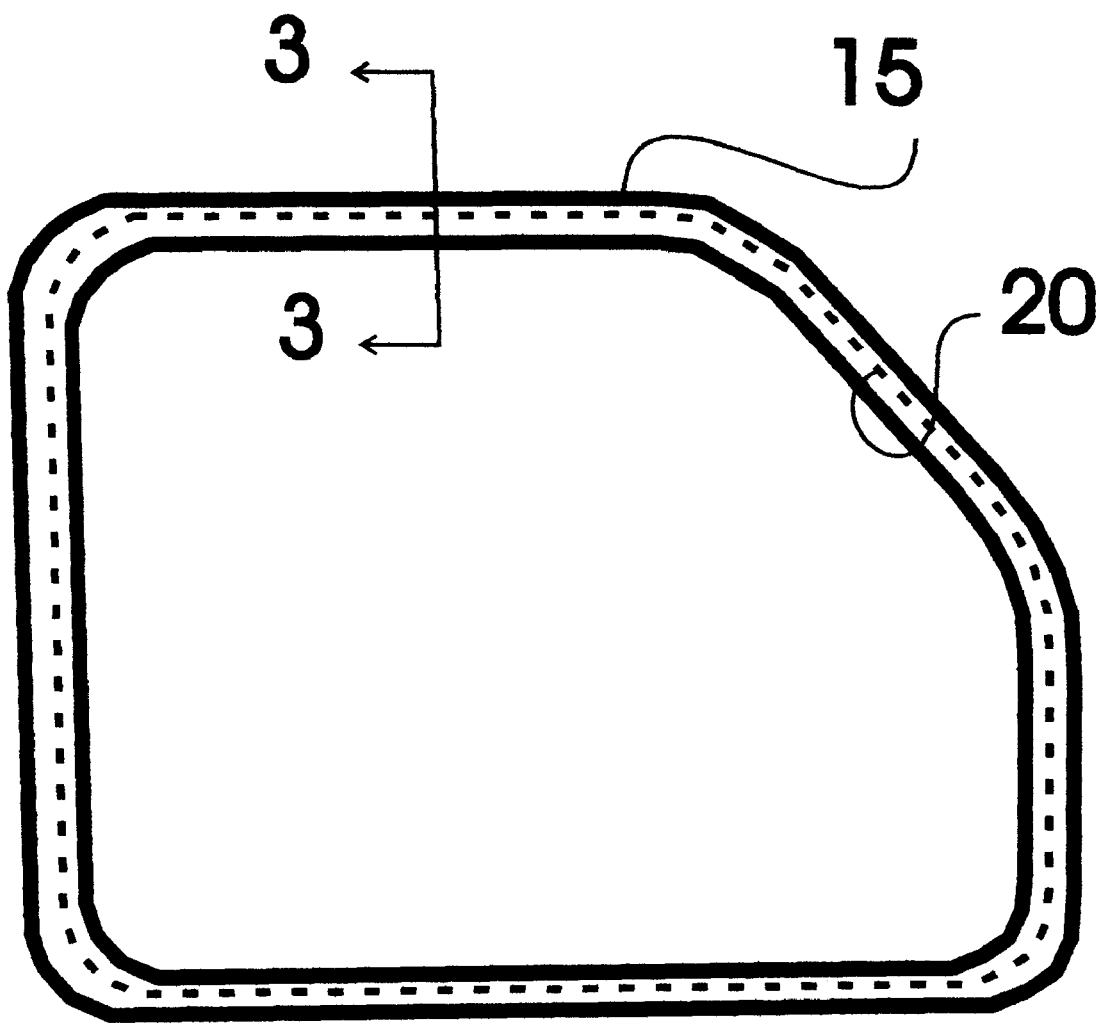
FIG. 2 is a isolated view of a weather stripping for a vehicle's door.

Referring to the figures in detail FIG. 1 is a top view of a typical vehicle illustrating the location of the system's component parts. The heating element 20 is placed inside the rubber weather stripping of any door or hatch desired by the user. FIG. 1 illustrates the placement of heating elements 20 upon the vehicle doors 10 and rear hatch 11 weather stripping. The heating element 20 is preferably a thin resistance type wire heating element which can be easily placed within the space 21 provided on weather stripping. The resistance type heating element 20 provides a consistent heating of the entire heating element around the circumference of the weather stripping around a door which the device is installed upon. FIG. 2 illustrates a typical weather stripping door piece 15 with the heating element 20 placed in the total length of the weather stripping. The separate heating elements on separate doors and/or hatch locations are electrically connected utilizing wire 12 or 13.

Control unit 30 is electrically powered by either lead 31 which extends to the vehicle's battery or electrical lead 32 which is positioned for plugging the control unit into a electrical outlet for utilizing 115 volt AC electrical power. The control unit 30 provides electrical power to the heating elements 20, and also includes a thermostatically controlled device for preventing the heating elements 20 from heating to a temperature which may deteriorate or damage the rubber weather stripping material. The thermostatic control also activates when the temperature in the area of the weather stripping reaches a level which freezes. A small thermistor is preferably in intimate contact with one of the heating elements and located on one of the heating elements located on the weather stripping of the vehicle. The thermistor provides temperature monitoring of the heating elements and the temperature in the weather stripping thereby either activating the control unit when the temperature reaches freezing or deactivating the control unit when the temperature reaches a preset level and which level will not damage the rubber weather stripping material.

Figure 3:
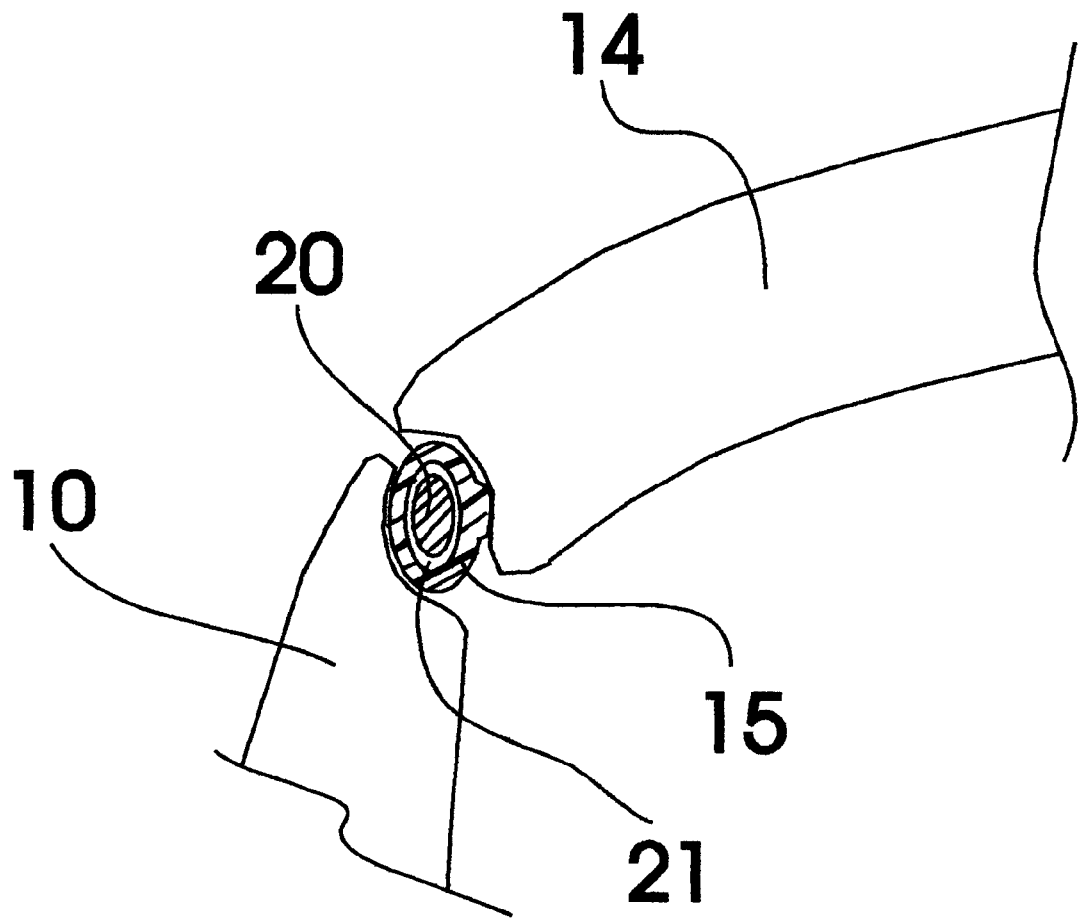
FIG. 3 is a cross-sectional view taking along line "A" of FIGS. 1 and 2 illustrating the relationship of a vehicle door, vehicle roof, weather stripping, and a heating element in place.

FIG. 3 illustrates a cross-section of a vehicle door 10 and a vehicle's roof 14 with the positioning of the vehicle weather stripping 15 fitted with a heating element 20 within space 21 of the weather stripping material.

Activation of the control unit may be accomplished by an on/off switch located within an interior of the vehicle, an on/off switch located on the exterior of the vehicle, or by a remote control button attached to a key ring of the user of the vehicle.

It is noted that the embodiment of the Heated vehicle weather stripping system described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In a motor vehicle having a number of vehicle doors hingedly attached to a vehicle body and having a number of rubber weather stripping elements each including a resilient rubber weather stripping portion, at least one of the rubber weather stripping elements being positioned between the vehicle body and each of the vehicle doors, the improvement comprising:

a) a heating element installed within each of the resilient rubber weather stripping portions that is controlled by a thermostatic control unit that prevents the heating element from being heated to a temperature above the point where the resilient rubber weather stripping portions would be damaged and further activates the heating element to prevent the resilient rubber weather stripping portions from being frozen, the heating element being activated by an on/off switch, and further wherein a thermistor is provided which is electrically wired to the thermostatic control unit and positioned in close proximity to one of the resilient rubber weather stripping portions and provides a monitoring means for monitoring the temperature of the weather stripping, the thermostatic control unit activating the heating element when the temperature of one of the resilient rubber weather stripping portions reaches freezing and deactivating the heating element when the temperature of one of the resilient rubber weather stripping portions reaches a preset level.

2. The improvement of claim 1 wherein each said heating element further comprises a wire resistance heating element positioned around a circumference of each said vehicle door.

* * * * *